US011070464B2

(12) United States Patent
Goud Gadela et al.

(10) Patent No.: US 11,070,464 B2
(45) Date of Patent: Jul. 20, 2021

(54) OPTIMIZED MULTICAST FORWARDING WITH A CACHE

(71) Applicant: Juniper Networks, Inc., Sunnyvale, CA (US)

(72) Inventors: Sri Karthik Goud Gadela, Cupertino, CA (US); Sharmila Koppula, Campbell, CA (US); Babu Singarayan, San Jose, CA (US); Sunanda L. Kommula, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/162,323

(22) Filed: Oct. 16, 2018

(65) Prior Publication Data

US 2020/0120013 A1 Apr. 16, 2020

(51) Int. Cl.
*H04L 12/761* (2013.01)
*H04L 12/707* (2013.01)
(Continued)

(52) U.S. Cl.
CPC .............. *H04L 45/16* (2013.01); *H04L 45/24* (2013.01); *H04L 45/742* (2013.01);
(Continued)

(58) Field of Classification Search
CPC ..... H04L 45/742; H04L 45/745; H04L 45/24; H04L 45/26; H04L 49/3009; H04L 49/25; H04L 47/806; H04L 49/201; H04L 45/16
See application file for complete search history.

(56) References Cited

U.S. PATENT DOCUMENTS

| 6,078,963 A * | 6/2000 | Civanlar ................. H04L 45/00 709/238 |
| 2014/0064091 A1* | 3/2014 | Basso ................. H04L 45/7453 370/235.1 |

(Continued)

OTHER PUBLICATIONS

"Terminology for forwarding information base (FIB) based router performance", RFC 3222, Dec. 2001.*

(Continued)

*Primary Examiner* — Ian N Moore
*Assistant Examiner* — Sun Jong Kim
(74) *Attorney, Agent, or Firm* — Shumaker & Sieffert, P.A.

(57) ABSTRACT

The techniques describe forwarding multicast traffic using a multi-level cache in a network device forwarding plane for determining a set of outgoing interfaces of the network device on which to forward the multicast traffic. For example, a multi-level cache is configured to store a multicast identifier of a multicast packet and multicast forwarding information associated with the multicast identifier, such as identification of one or more egress packet processors of the network device to which the multicast packet is to be sent for forwarding to the set of one or more egress network devices, and/or outgoing interfaces of the network device toward each egress network device of the set of one or more egress network devices. The multi-level cache is also configured to store respective multicast identifiers that are to be encapsulated with outgoing multicast packets that are forwarded to the set of one or more egress network devices.

18 Claims, 6 Drawing Sheets

(51) Int. Cl.
     *H04L 12/747*     (2013.01)
     *H04L 12/741*     (2013.01)
     *H04L 12/927*     (2013.01)
     *H04L 12/947*     (2013.01)

(52) U.S. Cl.
     CPC .......... *H04L 45/745* (2013.01); *H04L 47/806* (2013.01); *H04L 49/25* (2013.01)

(56) References Cited

U.S. PATENT DOCUMENTS

| | | | |
|---|---|---|---|
| 2015/0078378 A1* | 3/2015 | Wijnands | H04L 12/1886 370/390 |
| 2016/0119159 A1* | 4/2016 | Zhao | H04L 43/0811 370/390 |
| 2016/0191372 A1 | 6/2016 | Zhang et al. | |
| 2018/0097908 A1* | 4/2018 | Ayyagari | H04L 67/1097 |

OTHER PUBLICATIONS

Wijnands et al. "Multicast Using Bit Index Explicit Replication (BIER)" Internet Engineering Task Force (IETF), RFC 8279, Nov. 2017, 43 pp.

Extended Search Report from counterpart European Application No. 19180767.6, dated Dec. 11, 2019, 9 pp.

Response filed Oct. 21, 2020 to the Extended Search Report from counterpart European Application No. 19180767.6, dated Dec. 11, 2019, 24 pp.

\* cited by examiner

OPTIMIZED MULTICAST FORWARDING WITH A CACHE

TECHNICAL FIELD

The disclosure relates to computer networks and, more specifically, to forwarding packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

Routers may include one or more packet processors interconnected by an internal switch fabric. Packet processors receive and send data with other external devices via interface cards. The switch fabric provides an internal interconnect mechanism for forwarding data within the router between the packet processors for ultimate transmission over a network.

SUMMARY

In general, this disclosure describes techniques for forwarding multicast traffic using a multi-level cache in a network device forwarding plane for determining a set of outgoing interfaces of the network device on which to forward the multicast traffic. In some examples, a network device includes multiple packet processors, where each packet processor of the network device includes a multi-level cache configured to store multicast forwarding information to improve multicast forwarding. In some examples, a plurality of network devices, e.g., routers, of a network may implement multicast forwarding techniques, e.g., bit index explicit replication (BIER), in which the multicast group membership state of receivers is maintained in a packet rather than in the control plane of each multicast network device. In this example network, each egress network device of the multicast domain (e.g., BIER domain) is associated with a bit forwarding index which is represented as a bit in a bit-string of a multicast identifier (e.g., BIER header) encapsulated with the multicast packet.

When an ingress network device of the multicast domain receives a multicast packet, the ingress network device encapsulates the multicast packet with a multicast identifier that specifies a set of one or more egress network devices that are to receive the multicast packet. At each intermediate network device of the multicast domain, the intermediate network device examines the bit-string of the multicast identifier, determines multicast forwarding information, and outputs the multicast packet to corresponding egress network devices specified by the multicast identifier.

In some examples, the intermediate network device (and other network devices of the network) may include ingress packet processors (otherwise referred to herein as "source packet processors") that forward incoming data across the internal switch fabric towards one or more egress packet processors (e.g., otherwise referred to as "destination packet processors") for ultimate transmission over a network.

In accordance with the techniques described herein, each packet processor of a network device may comprise a multi-level cache configured to store multicast forwarding information to optimize multicast forwarding. As one example implementation, a multi-level cache is derived from an incoming multicast packet and is configured to store a multicast identifier of a multicast packet and multicast forwarding information associated with the multicast identifier, such as identification of one or more egress packet processors of the network device (referred to herein as "egress packet processor identifier") to which the multicast packet is to be sent for forwarding to the set of one or more egress network devices, and/or outgoing interfaces of the network device toward each egress network device of the set of one or more egress network devices. The multi-level cache is also configured to store respective multicast identifiers that are to be encapsulated with outgoing multicast packets that are forwarded to the set of one or more egress network devices.

In this way, when a network device receives a multicast packet encapsulated with a multicast identifier that matches the multicast identifier in the multi-level cache, the network device may determine the multicast forwarding information from the multi-level cache without performing a lookup of its forwarding plane data structure.

As a result, the techniques described herein may provide one or more technical advantages. For example, by configuring a multi-level cache to store multicast forwarding information, the number of hardware instructions required to implement multicast forwarding is reduced, thereby increasing the performance of the network device. In addition, the techniques described herein eliminates the need for sending control messages between forwarding units to synchronize caches across forwarding units, as the packet processor automatically derives the cache index from the incoming packet. Therefore, the techniques may require fewer processing resources and improve the operation (e.g., packet forwarding throughput) of the network device.

In one example, a method includes receiving, by a packet processor of a plurality of packet processors of a network device in a multicast domain, a multicast packet that includes a multicast identifier that specifies a set of one or more egress network devices of the multicast domain. The method also includes configuring, by the packet processor and in response to determining that a cache does not include the multicast identifier, a first level of the cache to store the multicast identifier as an index of the cache and at least one of (1) a corresponding egress packet processor identifier of one or more egress packet processors of the network device to which the multicast identifier indicates the multicast packet is to be sent for forwarding to the set of one or more egress network devices, and (2) respective outgoing interfaces of the network device to output the multicast packet toward corresponding egress network devices of the set of one or more egress network devices specified by the multicast identifier. The method further includes configuring, by the packet processor, a second level of the cache to store respective multicast identifiers for the corresponding egress network devices of the set of one or more egress network devices.

In another example, a network device includes a memory; and an ingress packet processor of a plurality of packet processors in communication with the memory, wherein the ingress packet processor is configured to: receive a multicast packet that includes a multicast identifier that specifies a set of one or more egress network devices of the multicast domain; configure, in response to determining that a cache of the ingress packet processor does not include the multicast identifier, a first level of the cache of the ingress packet processor to store the multicast identifier as an index of the cache of the ingress packet processor and a corresponding egress packet processor identifier of one or more egress packet processors of the network device to which the multicast identifier indicates the multicast packet is to be sent for forwarding to the set of one or more egress network devices; and configure a second level of the cache of the ingress packet processor to store respective multicast identifiers for the corresponding egress network devices of the set of one or more egress network devices.

In another example, a non-transitory computer-readable storage medium of a network device includes a plurality of packet processors, the non-transitory computer-readable storage medium storing instructions that when executed, cause one or more programmable processors of a network device to: receive a multicast packet that includes a multicast identifier that specifies a set of one or more egress network devices of the multicast domain; configure, in response to determining that a cache does not include the multicast identifier, a first level of the cache to store the multicast identifier as an index of the cache and at least one of (1) a corresponding egress packet processor identifier of one or more egress packet processors of the network device to which the multicast packet is to be sent for forwarding to the set of one or more egress network devices, and (2) respective outgoing interfaces of the network device to output the multicast packet toward corresponding egress network devices of the set of one or more egress network devices specified by the multicast identifier; and configure a second level of the cache to store respective multicast identifiers for the corresponding egress network devices of the set of one or more egress network devices.

The details of one or more examples of the techniques described herein are set forth in the accompanying drawings and the description below. Other features, objects, and advantages of the techniques described herein will be apparent from the description and drawings, and from the claims.

DETAILED DESCRIPTION

Figure 1:
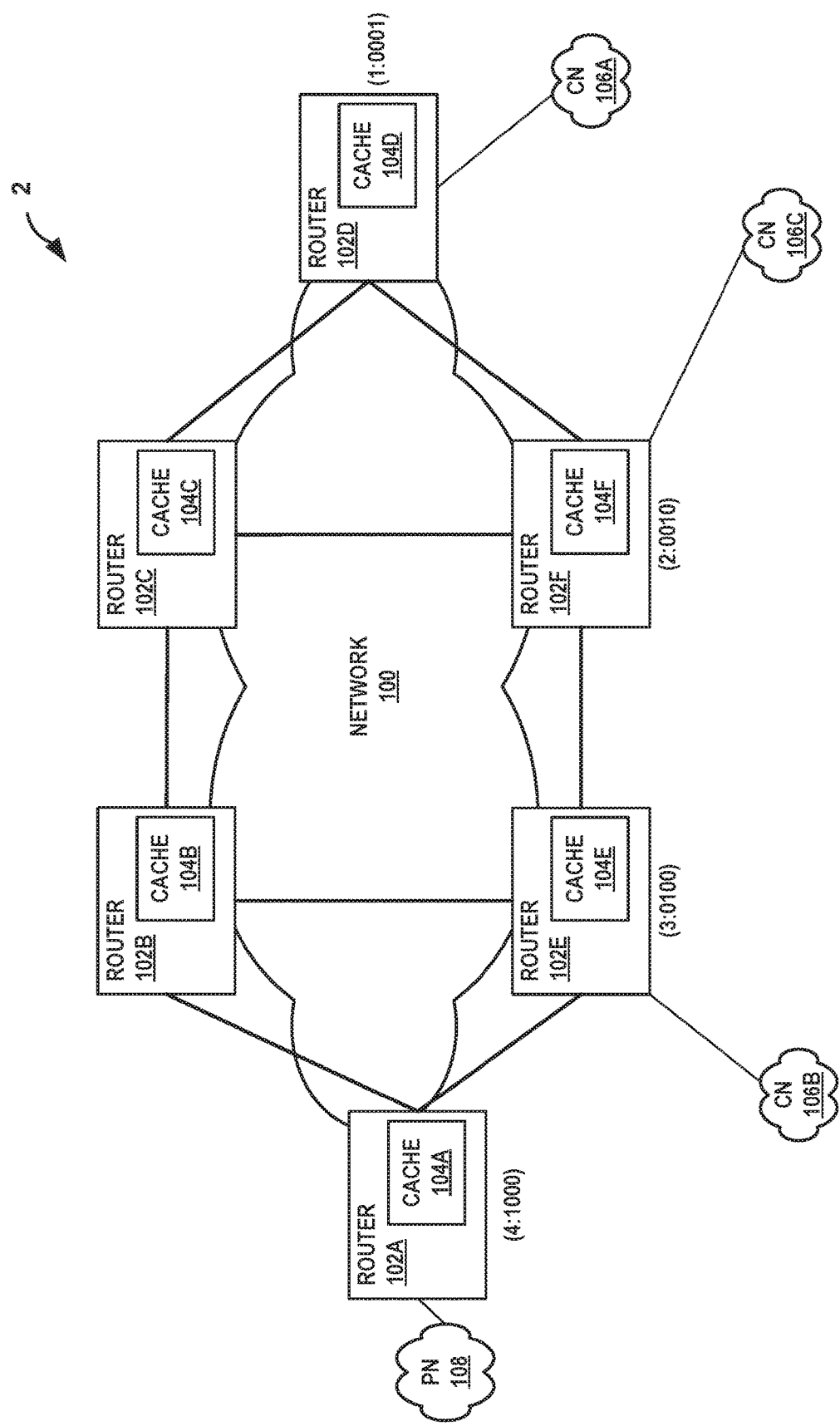
FIG. 1 is a block diagram illustrating an example network environment configured in accordance with one or more aspects of the techniques described in this disclosure.

FIG. 1 is a block diagram illustrating an example network environment 2 configured in accordance with one or more aspects of the techniques described in this disclosure. In the example of FIG. 1, network environment 2 may include network devices, e.g., routers 102A-102F (collectively, "routers 102") configured to transmit multicast traffic within a computer network 100 for receivers (not shown in FIG. 1) of one or more customer networks 106A-106C (collectively, "customer networks 106"). That is, routers 102 may provide customer networks 106 access to multicast traffic from a public network 108, such as the Internet or other provider networks. Although FIG. 1 is described with respect to routers, the techniques described herein may also be applied to switches or other network devices capable of routing packets.

Examples of computer network 100 include enterprise networks, branch networks, service provider networks, home networks, virtual private networks (VPNs), multicast virtual private networks (MVPNs), local area network (LANs), virtual LANs (VLANs) and the like. In some cases, the computer network may be configured to support multicast traffic, such as Internet Protocol Television (IPTV), desktop conferences, corporate broadcasts, music and video web casts, and other forms of multimedia content. In any of these examples, remotely located source devices (not shown) and receivers (also not shown) may share data via the computer network 100. Source devices and receivers may comprise one or more servers or employee computer terminals located in different regions of a single office location, or may comprise a remote office location of a corporation. Each of the source device and receivers may be included in a remote site (e.g., customer networks 106) that may comprise a private network and may include local area networks (LANs) or wide area networks (WANs) that comprise a plurality of subscriber devices (not shown). The subscriber devices may include personal computers, laptops, workstations, personal digital assistants (PDAs), Internet of Things (IOT) devices, wireless devices, network-ready appliances, file servers, print servers or other devices. Customer network 106 may each be configured to support multicast traffic as described above. Receivers may each request or subscribe to traffic from one or more multicast groups. Routers 102 within network 100 may be connected to one or more source devices and/or one or more receivers to provide routing of multicast traffic.

Routers 102 within network 100 may implement multicast techniques, e.g., Bit Index Explicit Replication (BIER). In a multicast network such as a BIER network, the multicast group membership state of egress network devices of the multicast domain (e.g., BIER domain) is included in a multicast packet rather than maintained in the control plane of each multicast router in the BIER network. For example, the multicast group membership state of egress routers 102D-102F (collectively, "egress routers 102") of a particular multicast stream is maintained in a bit-string of a multicast identifier (e.g., BIER header) of a multicast packet. For example, a bit-string comprises a set of sub-strings that identifies one or more egress routers. As one example implementation, a bit-string of 0111 may identify egress router 102D (0001), egress router 102F (0010), and egress router 102E (0100). In a BIER network, only an ingress router, e.g., router 102A, has knowledge of the one or more egress routers, e.g., routers 102D-102F, of the multicast domain.

As shown in the example of FIG. 1 and as further described in FIG. 2 below, ingress router 102A may receive a multicast packet from a source device (not shown) and may encapsulate the multicast packet with a multicast identifier (e.g., 0111) that specifies a set of one or more egress routers (e.g., routers 102D-102F) of the multicast domain that are to receive the multicast packet. The multicast packet that is encapsulated with a multicast identifier is referred to herein as "encapsulated multicast packet."

Intermediate routers 102B-102C may receive the encapsulated multicast packet, process the multicast packet based on the multicast identifier, and may output the multicast packet toward the set of one or more egress routers specified by the multicast identifier. For example, the intermediate routers may remove the multicast identifier encapsulated with the incoming multicast packet and encapsulate respective multicast identifiers with an outgoing multicast packet that specifies corresponding egress network devices of the set of one or more egress network devices of the multicast domain.

Egress routers 102D-102F may each receive a multicast packet encapsulated with a respective multicast identifier that specifies itself, and forwards the multicast packet to corresponding multicast receivers. Further examples of BIER are described in Wijnands, IJ, "Multicast Using Bit Index Explicit Replication (BIER)," Internet Engineering Task Force, Request for Comments (RFC) 8279, November 2017, the entire contents of which are incorporated by reference herein.

In some examples, one or more routers 102 may implement a distributed forwarding engine architecture in which a router includes packet processors interconnected by an internal switch fabric. As further described with respect to FIG. 3, packet processors receive and send data with other external devices via interface cards. The switch fabric provides an internal interconnect mechanism for forwarding data within the router between the packet processors for ultimate transmission over a network, e.g., network 100. For example, network traffic that is received by a router or switching device travels from an ingress packet processor to an egress packet processor via the switch fabric, and is transmitted over the network by the egress packet processor.

Typically, each intermediate router processes an incoming encapsulated multicast packet by examining each bit of the multicast identifier and executes, for each bit, an instruction chain that includes delivering the multicast packet to a control plane or adding encapsulations and hash calculation for Equal-Cost Multi-Path (ECMP) link election. As one example, an intermediate router performs a lookup of its forwarding plane data structure (e.g., Bit Index Forwarding Table (BIFT)) to determine respective multicast forwarding information for outputting the multicast packet over network 100. For example, the intermediate router performs a lookup of the forwarding plane data structure to determine corresponding neighboring routers and respective encapsulation information (e.g., outgoing bitmasks) that are to be encapsulated with outgoing multicast packets to the corresponding neighboring routers.

The intermediate router typically processes the packet described above for each multicast packet received by the intermediate router. For example, the intermediate router typically performs a logical AND operation to determine the multicast forwarding information, and performs another logical AND operation to clear each bit that was processed. However, as the bit-string length increases, the number of hardware instructions to perform the packet processing as described above is increased, thereby resulting in excessive overhead. In the examples in which network devices implement a distributed forwarding architecture with an ingress packet processor and one or more egress packet processors, the overhead is further increased on the hardware.

In accordance with the techniques described herein, a network device includes a multi-level cache configured to store multicast forwarding information to optimize multicast forwarding. In the example of FIG. 1, routers 102 may include multi-level caches 104A-104F (collectively, "caches 104"), respectively, that each stores multicast forwarding information that resulted from a prior lookup of a forwarding plane data structure (e.g., BIFT).

For example, when a router, e.g., router 102B, receives a multicast packet encapsulated with a multicast identifier that specifies a set of one or more egress routers, e.g., routers 102D-102F, router 102B may perform a lookup of multi-level cache 104B to determine whether multi-level cache 104B includes the multicast identifier. If multi-level cache 104B includes the multicast identifier of the incoming multicast packet (e.g., the multicast identifier encapsulated with the multicast packet matches the multicast identifier stored in multi-level cache 104B), router 102B may determine multicast forwarding information associated with the multicast identifier included in multi-level cache 104B without performing a lookup of its forwarding plane data structure (e.g., BIFT) to determine the multicast forwarding information. If cache 104B does not include the multicast identifier of the incoming multicast packet, router 102B may configure multi-level cache 104B to store the multicast identifier as an index of multi-level cache 104B and store multicast forwarding information resulting from a lookup of the forwarding plane data structure for the current multicast packet such that when router 102B receives a subsequent multicast packet with a multicast identifier that matches the multicast identifier included in multi-level cache 104B, router 102B may determine the multicast forwarding information from multi-level cache 104B without performing a lookup of the forwarding plane data structure.

As a result, the techniques described herein may provide one or more technical advantages. For example, by configuring a cache to store multicast forwarding information, the number of hardware instructions required to implement multicast forwarding is reduced, thereby increasing the performance of the network device. In addition, the techniques described herein eliminates the need for sending control messages between forwarding units to synchronize caches across forwarding units, as the packet processor automatically derives the cache index from the incoming packet. Therefore, the techniques may require fewer processing resources and improve the operation (e.g., packet forwarding throughput) of the network device.

Figure 2:
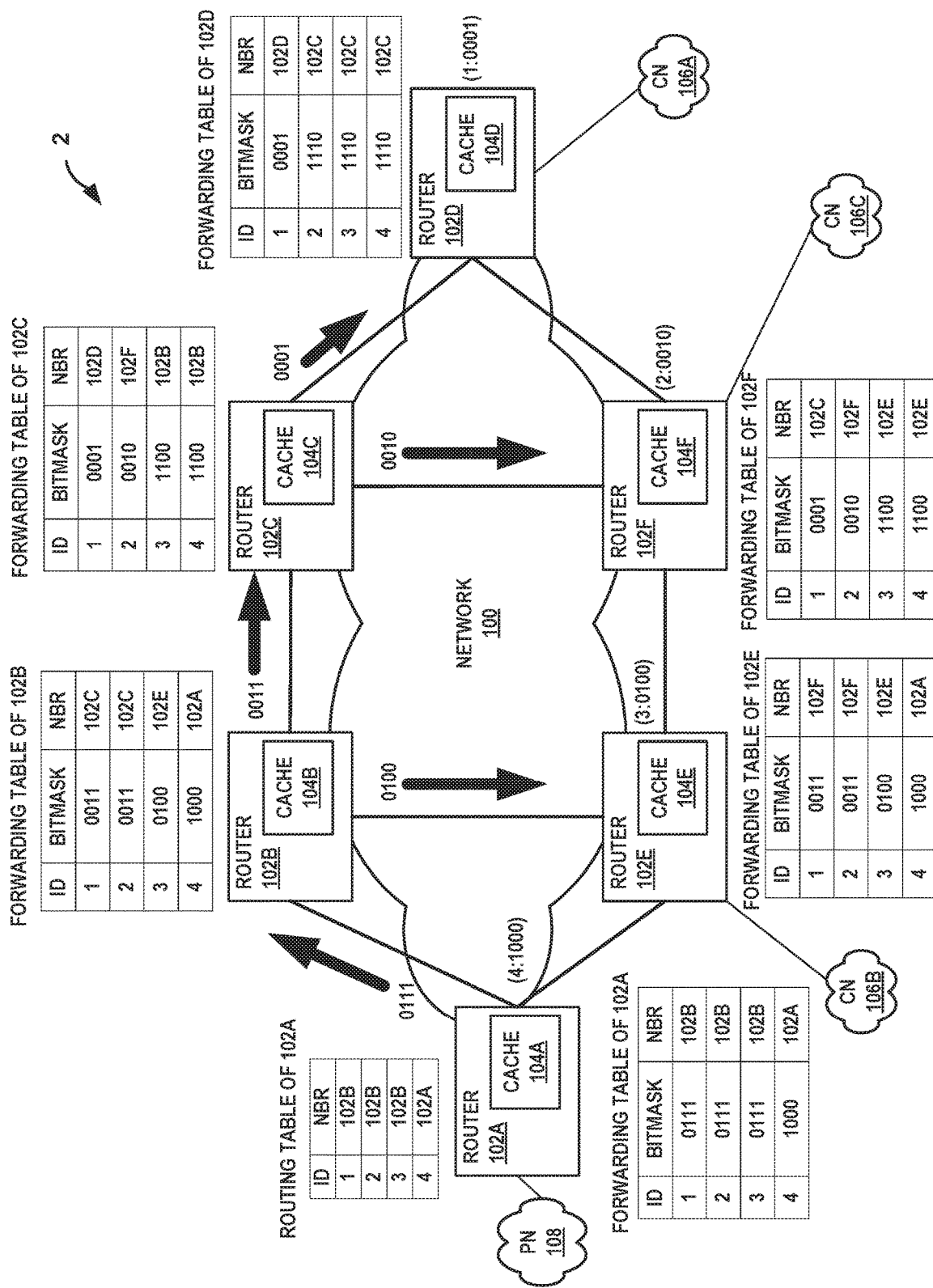
FIG. 2 is a block diagram illustrating in further detail the example network environment configured in accordance with one or more aspects of the techniques described in this disclosure.

FIG. 2 is a block diagram illustrating in further detail the example network environment 2 of FIG. 1 configured in accordance with one or more aspects of the techniques described in this disclosure. In the example of FIG. 2, each of routers 102 may be assigned a unique bit position of a bit-string. For example, ingress router 102A may be assigned a bit position of 4 (e.g., 1000), egress router 102E is assigned a bit position of 3 (e.g., 0100), egress router 102F is assigned a bit position of 2 (e.g., 0010), and egress router 102D may be assigned a bit position of 1 (e.g., 0001).

Each of the bit positions is mapped to a respective Bit Forwarding Router prefix (BFR-prefix), i.e., a locally reachable address. Each of routers 102 may flood the bit position to BFR-prefix mapping to each other within the BIER domain. For example, each of routers 102 may use Border Gateway Protocol or Interior Gateway Protocol (IGP), such as Intermediate-System to Intermediate-System (IS-IS) protocol or Open Shortest Path First (OSPF) protocol, to advertise the bit position to BFR-prefix mapping and bit-string length.

Each of routers 102 may establish adjacencies between pairs of routers 102 and determines one or more best paths for a given set of routers 102. For example, each of routers 102 may configure the adjacencies and best path based on a topology that the IGP (e.g., OSPF) uses for unicast routing.

Based on the advertised bit position to BFR-prefix mappings, each of routers 102 may generate a forwarding plane data structure/table (e.g., BIFT) that includes multicast forwarding information to reach the egress routers 102D-102F. As one example, the forwarding plane data structure includes identifiers of the egress routers 102 (e.g., BFR-IDs), outgoing bitmasks (e.g., bitmasks generated based on bit positions of egress routers reachable by a corresponding neighboring router that are logically ORed together) that are to be encapsulated with outgoing multicast packets, and neighboring router information. In the example of FIG. 2, router 102B may include a forwarding plane data structure with first entry for BFR-ID of router 102D (e.g., 1) that is reachable by neighboring router 102C using an outgoing bitmask of 0011. The forwarding plane data structure of router 102B may also include a second entry for BFR-ID of router 102F (e.g., 2) that is reachable by neighboring router 102C using an outgoing bitmask of 0011. The forwarding plane data structure of router 102B may further include a third entry for BFR-ID of router 102E (e.g., 3) that is reachable by neighboring router 102E using an outgoing bitmask of 0100. The forwarding plane data structure of router 102B may further include a fourth entry for BFR-ID of router 102A (e.g., 4) that is reachable by router 102A using outgoing bitmask of 1000.

In accordance with the techniques described herein, each of routers 102 may include a cache configured to store multicast forwarding information to optimize multicast forwarding. In the example of FIG. 2, each of routers 102 may include caches 104A-104F (collectively, "caches 104"), respectively, that each store multicast forwarding information that resulted from a prior lookup of a forwarding plane data structure (e.g., BIFT). As one example implementation, each of caches 104 may be configured to store a multicast identifier of a multicast packet as an index of the cache, identification information of a corresponding egress packet processor ("egress packet processor identifier") to which the multicast packet is to be sent for forwarding to the one or more egress routers 102D-102F, and/or respective outgoing interfaces of the router to output the multicast packet toward each egress router of the set of one or more egress routers specified by the multicast identifier. Each of caches 104 may also include respective multicast identifiers (e.g., outgoing bitmasks) that are to be encapsulated with outgoing multicast packets. As further described below, each stream in the multicast network can be uniquely identified/indexed with a <BIER-bit-string, entropy> tuple.

In operation, ingress router 102A may receive a multicast packet from a source network device (not shown) destined for multicast receivers reachable via egress routers 102D-102F. Ingress router 102A may encapsulate the multicast packet with a multicast identifier (e.g., bit-string of a BIER header) that includes a string of bits that specifies a set of one or more egress routers 102 of the multicast domain that are to receive the multicast packet. As shown in the example of FIG. 2, ingress router 102A may encapsulate a multicast packet with a multicast identifier of 0111 to reach egress routers 102D-102F, and forwards the encapsulated multicast packet to neighboring router 102B.

Router 102B, in response to receiving the encapsulated multicast packet from ingress router 102A, may perform a lookup of cache 104B to determine whether cache 104B includes the multicast identifier of 0111. For example, router 102B may perform a lookup of cache 104B and determine that the multicast identifier of 0111 of the incoming multicast packet matches the multicast identifier included in cache 104B. If the cache 104B includes the multicast identifier of 0111, router 102B may determine multicast forwarding information associated with the multicast identifier of 0111 from cache 104B without performing a lookup of the forwarding plane data structure (e.g., BIFT). That is, router 102B may determine from cache 104B the egress packet processor identifier to which the incoming multicast packet is to be sent for forwarding to the egress routers 102D-102F, and/or respective outgoing interfaces of router 102B toward each of egress routers 102D-102F specified by the multicast identifier. Router 102B may also determine from cache 104B respective multicast identifiers (e.g., outgoing bitmasks) that are to be encapsulated with outgoing multicast packets output to egress routers 102D-102F.

If the multicast identifier of 0111 of the incoming multicast packet does not match the multicast identifier of cache 104B (or does not exist in cache 104B), router 102B may configure cache 104B to store the multicast identifier of 0111 as an index of cache 104B and to store the multicast forwarding information determined from a lookup of the forwarding plane data structure for the current multicast packet. For example, router 102B may perform a lookup of its forwarding plane data structure to determine the egress packet processor identifier to which the current multicast packet is to be sent for forwarding to egress routers 102D-102F, and/or respective outgoing interfaces of router 102B toward each of egress routers 102D-102F specified by the multicast identifier. As one example, router 102B may perform a logical AND operation between the multicast identifier of 0111 of the incoming multicast packet and each outgoing bitmask of the forwarding plane data structure. In response to performing the logical AND operation, router 102B may determine that respective multicast packets are to be sent to neighboring routers 102C and 102E with multicast identifiers 0011 and 0100, respectively.

Router 102B may also perform a lookup of a next hop database to determine corresponding egress packet processors of router 102B to which the multicast packet is to be sent for forwarding to egress routers 102D-102F, and respective outgoing interfaces of router 102B to output the multicast packet toward egress routers 102D-102F. In response, router 102B may store the egress packet processor identifier, the respective outgoing interfaces of router 102B in cache 104B, and respective) multicast identifiers (e.g., outgoing bitmasks) to be encapsulated with outgoing multicast packets. In this way, when router 102B receives a subsequent multicast packet including a multicast identifier of 0111, router 102B may perform a lookup of cache 104B to determine the multicast forwarding information without performing a lookup of the forwarding plane data structure.

In response to determining the multicast forwarding information, router 102B may output the multicast packet to corresponding egress routers. For example, router 102B may encapsulate a multicast identifier of 0011 to an outgoing multicast packet to neighboring router 102C and encapsulate a multicast identifier of 0100 to an outgoing multicast packet to neighboring router 102E. When egress router 102E receives the multicast packet with multicast identifier of 0100, egress router 102E identifies itself as the egress router for the multicast packet and forwards the multicast packet to a connected multicast receiver. Intermediate router 102C may receive the multicast packet with multicast identifier of 0011 from router 102B, process the incoming multicast packet in a similar manner as router 102B, and output outgoing multicast packets with multicast identifiers of 0001 and 0010 to neighboring routers 102D and 102F, respectively.

When egress router 102F receives the multicast packet with multicast identifier of 0010, egress router 102F identifies itself as the egress router for the multicast packet and forwards the multicast packet to a connected multicast receiver. Similarly, when egress router 102D receives the multicast packet with multicast identifier of 0001, egress router 102D identifies itself as the egress router for the multicast packet and forwards the multicast packet to a connected multicast receiver.

Figure 3:
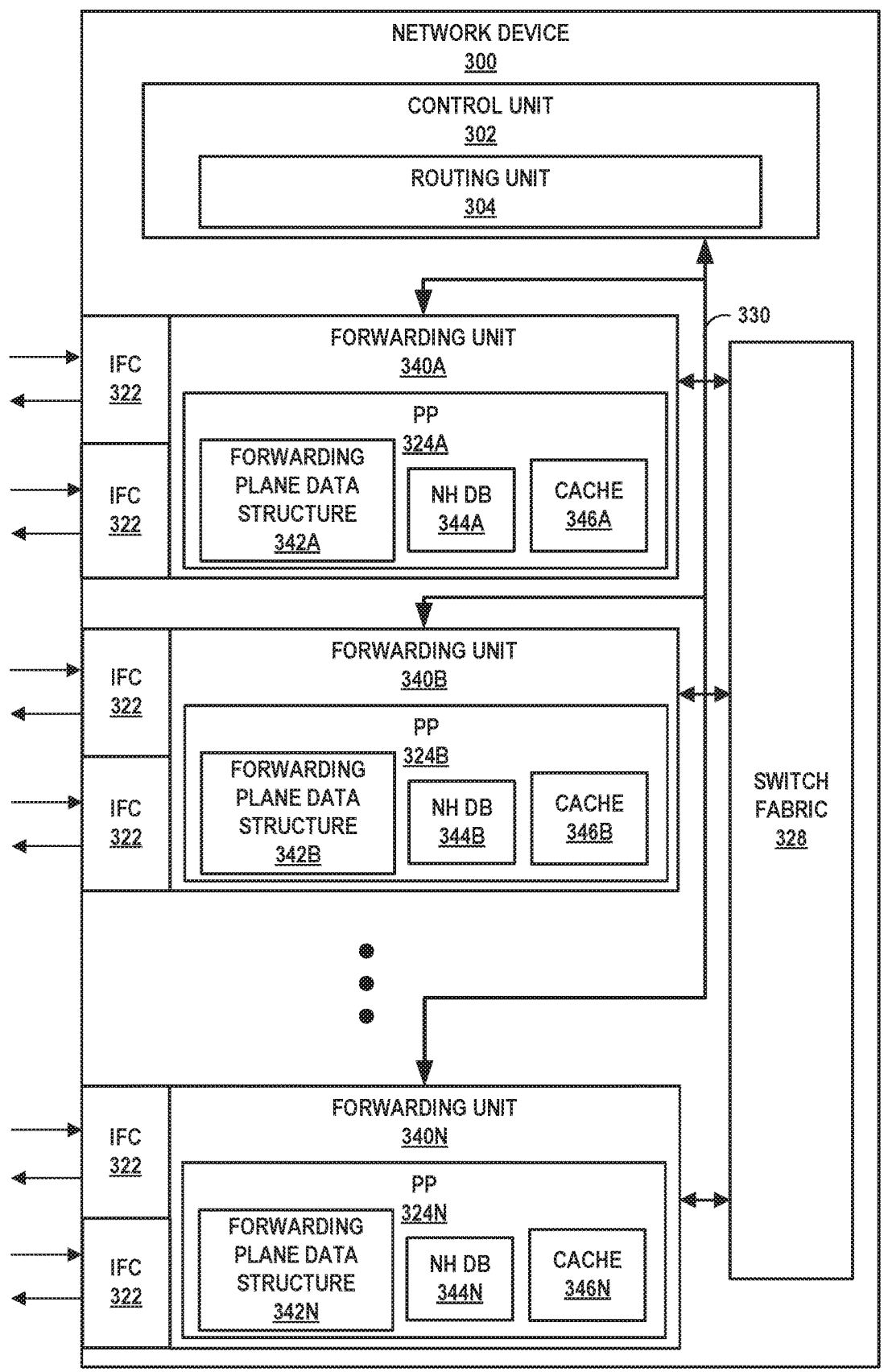
FIG. 3 is a block diagram illustrating an example network device, in accordance with one or more aspects of the techniques described in this disclosure.

FIG. 3 is a block diagram illustrating an example network device 300 configured in accordance with one or more aspects of the techniques described in this disclosure. Network device 300 may represent any of routers 102 of FIGS. 1-2, for example.

In this example, network device 300 includes a control unit 302 that provides control plane functionality for network device 300. Control unit 302 may be distributed among multiple entities, such as one or more routing units and one or more service cards insertable into network device 300. In such instances, network device 300 may therefore have multiple control planes.

Control unit 302 may include a routing unit 304 that provides control plane functions, storing network topology in the form of routing tables, executing routing protocols to communicate with peer routing devices, and maintaining and updating the routing tables. Routing unit 304 also provides an interface to allow user access and configuration of network device 300.

Network device 300 also includes a plurality of forwarding units, e.g., forwarding units 340, and a switch fabric 328, that together provide a forwarding plane for forwarding and otherwise processing subscriber traffic.

Control unit 302 is connected to each of forwarding units 340 by internal communication link 330. Internal communication link 330 may comprise a 100 Mbps or 1 Gbps Ethernet connection, for instance. Routing unit 304 may execute daemons (not shown), e.g., user-level processes that may run network management software, to execute routing protocols to communicate with peer routing devices, execute configuration commands received from an administrator, maintain and update one or more routing tables, manage subscriber flow processing, and/or create one or more forwarding plane data structures 342 (e.g., forwarding tables) for installation to forwarding units 340, among other functions.

Control unit 302 may include one or more processors (not shown in FIG. 3) that execute software instructions, such as those used to define a software or computer program, stored to a computer-readable storage medium (again, not shown in FIG. 3), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 302 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Forwarding units 340 receive and send data packets via interfaces of interface cards 322 ("IFCs 322") each associated with a respective one of forwarding units 340. Each of forwarding units 340 and its associated ones of IFCs 322 may reside on a separate line card (not shown) for network device 300. Example line cards include flexible programmable integrated circuit (PIC) concentrators (FPCs), dense port concentrators (DPCs), and modular port concentrators (MPCs). Each of IFCs 322 may include interfaces for various combinations of layer two (L2) technologies, including Ethernet, Gigabit Ethernet (GigE), and Synchronous Optical Networking (SONET) interfaces. In various aspects, each of forwarding units 340 may comprise more or fewer IFCs. Switch fabric 328 provides a high-speed interconnect for forwarding incoming data packets to the selected one of forwarding units 340 for output over a network. Switch fabric 328 may include multiple fabric links (not shown).

In some examples, switch fabric 328 may be a distributed, multi-stage switch fabric architecture, in which network packets traverse multiple stages of the switch fabric located in distributed forwarding units of the router to travel from an ingress point of the switch fabric to an egress point of the switch fabric. As one example, switch fabric 328 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

Forwarding units 340 process packets by performing a series of operations on each packet over respective internal packet processing paths as the packets traverse the internal architecture of network device 300. Operations may be performed, for example, on each packet by any of a corresponding ingress interface, an ingress forwarding unit (e.g., forwarding unit 340A), an egress forwarding unit (e.g., forwarding unit 340N), an egress interface or other units of network device 300 to which the packet is directed prior, such as one or more service cards. The result of packet processing determines the way a packet is forwarded or otherwise processed by forwarding units 340 from its input interface on one of IFCs 322 to its output interface on one of IFCs 322.

To illustrate by way of an example, assume forwarding units 340A and 340N may include PPs 324A-324N, respectively (collectively, "PPs 324"). In the example of FIG. 3, forwarding unit 340A may represent an ingress forwarding unit ("source forwarding unit") and forwarding unit 340N may represent an egress forwarding unit ("destination forwarding unit"). Forwarding unit 340A may initially forward the incoming traffic to forwarding unit 340N, which in turn forwards the packet to the network.

PPs 324 may include forwarding plane data structures 342A-342N (collectively, "forwarding plane data structures 342"), respectively, that may represent a Bit Index Forwarding Table (BIFT)) including identifiers of the egress routers 102 (e.g., BFR-IDs), outgoing bitmasks (e.g., bitmasks generated based on bit positions of egress routers reachable by a corresponding neighboring router that are logically ORed together), and neighboring router information.

PPs 324 may also include next hop databases 344A-344N (collectively, "next hop databases 344") that include information on egress packet processors mapped to neighboring routers identified in forwarding plane data structures 342 for which an ingress packet processor is to forward the multicast packet via switch fabric 328, and interfaces (e.g., IFCs 322) for which network device 300 may output the multicast packet over the network.

In accordance with the techniques described herein, packet processors 324 may include caches 346A-346N (collectively, "caches 346"), respectively, that each includes multicast forwarding information that resulted from a prior lookup of forwarding plane data structure. Assume for example network device 300 is an intermediate router (e.g., router 102B of FIG. 2), PP 324A is an ingress packet processor, and PP 324N is an egress packet processor. In this example, ingress PP 324A may receive a multicast packet including a multicast identifier (e.g., bit-string of a BIER header) from its input interface (e.g., one of IFCs 322 of forwarding unit 340A). Ingress PP 324A may perform a lookup of cache 346A to determine whether cache 346A includes the multicast identifier from the incoming multicast packet. If cache 346A includes the multicast identifier of the incoming multicast packet, ingress PP 324A may determine multicast forwarding information (e.g., egress packet processor identifier) associated with the multicast identifier included in cache 346A without performing a lookup of forwarding plane data structure 342A, and may send a copy of the multicast packet to egress PP 324N via switch fabric 328.

If cache 346A does not include the multicast identifier encapsulated with the incoming multicast packet, ingress PP 324A configures cache 346A based on the incoming multicast packet and stores multicast forwarding information resulting from a lookup of forwarding plane data structure 342A and next hop database 344A. For example, ingress PP 324A may configure cache 346A to store the multicast identifier from the incoming multicast packet as an index to cache 346A. Ingress PP 324A also performs a lookup of forwarding plane data structure 342A to determine the neighboring routers and respective multicast identifiers (e.g., outgoing bitmasks) to be encapsulated with outgoing multicast packets to the neighboring routers, and performs a lookup of next hop database 344A to determine the egress packet processor to which the multicast packet is to be sent for forwarding to the one or more egress routers. The information resulting from the lookup of forwarding plane data structure 342A and next hop database 344A are stored in cache 346A.

In response to determining the multicast forwarding information, ingress PP 324A may forward a copy of the multicast packet to a corresponding egress packet processor, e.g., egress PP 324N. When egress PP 324N receives the copy of the multicast packet from ingress PP 324A, egress PP 324N may perform a lookup of cache 346N to determine whether cache 346N includes the multicast identifier from the multicast packet received from ingress PP 324A. If cache 346N includes the multicast identifier of the incoming multicast packet, egress PP 324N may determine multicast forwarding information (e.g., outgoing interfaces and outgoing bitmasks) associated with the multicast identifier included in cache 346N without performing a lookup of forwarding plane data structure 342N, and send an outgoing multicast packet encapsulated with a respective outgoing bitmask through a corresponding outgoing interface (e.g., IFCs 322) toward an egress router of the set of one or more egress routers specified in the multicast identifier.

If cache 346N does not include the multicast identifier, egress PP 324N configures cache 346N to store multicast forwarding information resulting from a lookup of forwarding plane data structure 342N and next hop database 344N. For example, egress PP 324N may configure cache 346N to store the multicast identifier from the incoming multicast packet as an index to cache 346N. Egress PP 324N also performs a lookup of forwarding plane data structure 342N to determine the neighboring routers and outgoing bitmasks to encapsulate an outgoing multicast packet to the neighboring routers, and performs a lookup of next hop database 344N to determine the outgoing interfaces (e.g., IFCs 322) of network device 300 to output the multicast packet to the one or more egress routers specified by the multicast identifier. The information resulting from the lookup of forwarding plane data structure 342N and next hop database 344N is stored in cache 346N.

In this way, when ingress PP 324A receives a subsequent multicast packet including a multicast identifier that is included in the cache 346A, ingress PP 324A may determine from cache 346A the egress packet processor identifier to forward a copy of the multicast packet to egress PP 324B without performing a lookup of forwarding plane data structure 342A. Similarly, when egress PP 324N receives the subsequent multicast packet including the multicast identifier that is included in the cache 346N, egress PP 324N may determine from cache 346N the outgoing bitmask and outgoing interface of network device 300 to output the multicast packet encapsulated with the outgoing bitmask to the neighboring router.

Figure 4:
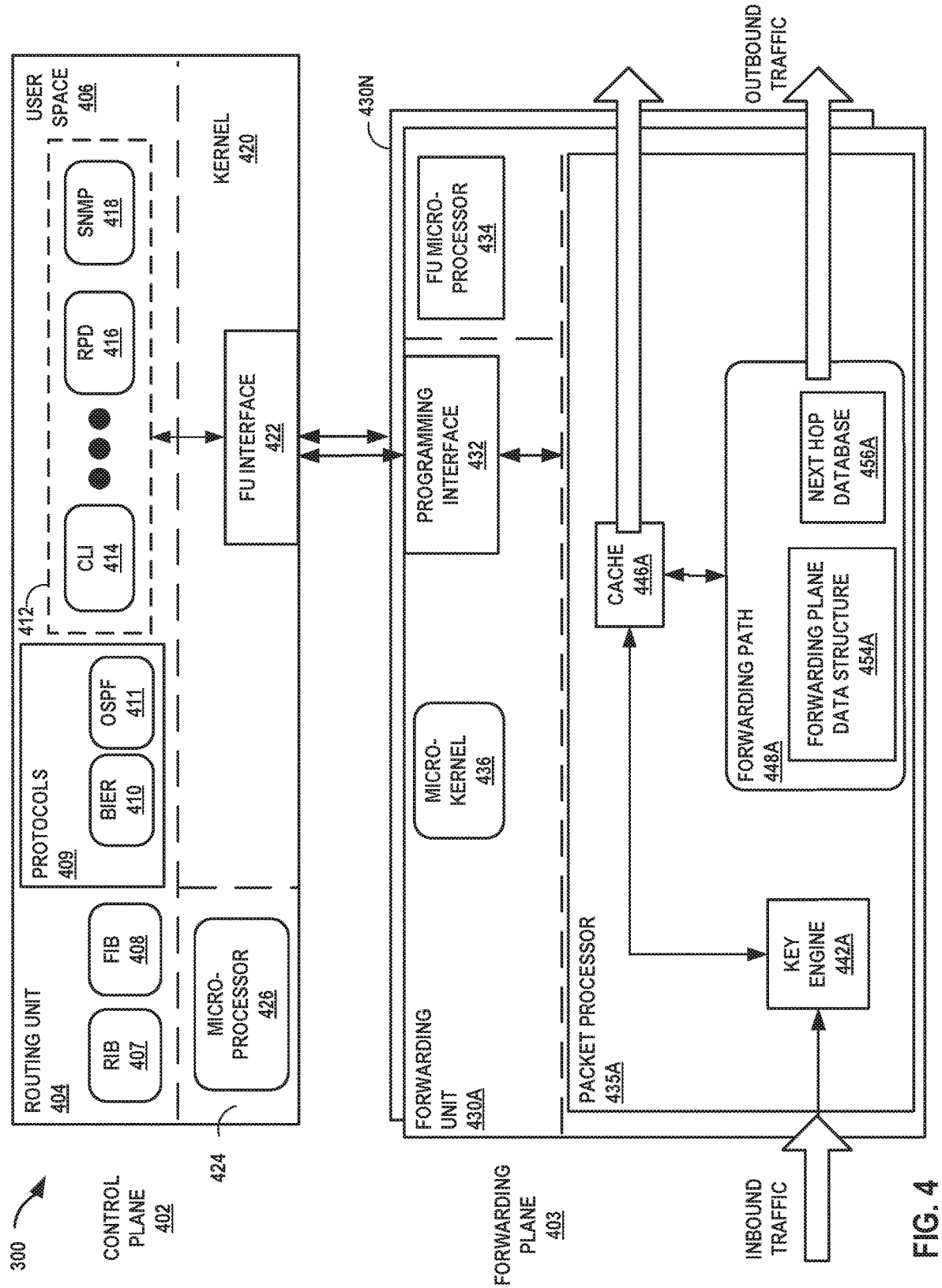
FIG. 4 is a block diagram illustrating units of the network device of FIG. 3 in further detail, in accordance with one or more aspects of the techniques described in this disclosure.

FIG. 4 is a block diagram illustrating units of network device 300 of FIG. 3 in further detail. Any of forwarding units 430A-430N (collectively, "forwarding units 430") may operate as a source forwarding unit and/or a destination forwarding unit. Although FIG. 4 illustrates only forwarding unit 430A in detail, each of forwarding units 430 of network device 300 comprises similar modules that perform substantially similar functionality.

In this example, routing unit 404 provides a control plane 402 operating environment for execution of various user-level daemons 412 executing in user space 406. Daemons 412 are user-level processes that may run network management software, execute routing protocols to communicate with peer routing devices, execute configuration commands received from an administrator, maintain and update one or more routing tables, manage subscriber flow processing, and/or create one or more forwarding tables for installation to forwarding units 430, among other functions. In this example, daemons 412 include command-line interface daemon 414 ("CLI 414"), routing protocol daemon 416 ("RPD 416"), and Simple Network Management Protocol daemon 418 ("SNMP 418"). In this respect, control plane 402 may provide routing plane, service plane, and management plane functionality for the network device. Various instances of routing unit 404 may include additional daemons 412 not shown in FIG. 4 that perform other control, management, or service plane functionality and/or drive and otherwise manage forwarding plane functionality for the network device.

Daemons 412 operate over and interact with kernel 420, which provides a run-time operating environment for user-level processes. Kernel 420 may comprise, for example, a UNIX operating system derivative such as Linux or Berkeley Software Distribution (BSD). Kernel 420 offers libraries and drivers by which daemons 412 may interact with the underlying system. Forwarding unit interface 422 ("FU interface 422") of kernel 420 comprises a kernel-level library by which daemons 412 and other user-level processes or user-level libraries may interact with programming interface 432 of forwarding unit 430A. FU interface 422 may include, for example, a sockets library for communicating with forwarding units 430 over dedicated network links.

Hardware environment 424 of routing unit 404 comprises microprocessor 426 that executes program instructions loaded into a main memory (not shown in FIG. 4) from storage (also not shown in FIG. 4) in order to execute the software stack, including both kernel 420 and user space 406, of routing unit 404. Microprocessor 426 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 416 executes one or more interior and/or exterior routing protocols to exchange routing information with other network devices and store received routing information in routing information base 407 ("RIB 407"). For example, RPD 416 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RPD 416 may additionally, or alternatively, execute User Datagram Protocol (UDP) to send and receive data for various system resources, such as physical interfaces. Although described with respect to UDP, RPD 416 may execute any protocol to exchange data for system resources. In the example of FIG. 4, RPD 416 may further execute protocols 409, including Bit Index Explicit Replication (BIER) 410 and Open Shortest Path First (OSPF) protocol 411, in accordance with the techniques described herein.

RIB 407 may include information defining a topology of a network, including one or more routing tables and/or link-state databases. RPD 416 resolves the topology defined by routing information in RIB 407 to select or determine one or more active routes through the network and then installs these routes to forwarding information base 408. Typically, RPD 416 generates FIB 408 in the form of a radix or other lookup tree to map packet information (e.g., header information having destination information and/or a label stack) to next hops and ultimately to interface ports of interface cards associated with respective forwarding units 430. Kernel 420 may synchronize FIB 408 of routing unit 404 with forwarding information of forwarding unit 430A.

Command line interface daemon 414 ("CLI 414") provides a shell by which an administrator or other management entity may modify the configuration of the network device using text-based commands. SNMP 418 comprises an SNMP agent that receives SNMP commands from a management entity to set and retrieve configuration and management information for network device 300. Using CLI 414 and SNMP 418, for example, management entities may enable/disable and configure services, manage classifications and class of service for packet flows, install routes, enable/disable and configure rate limiters, configure traffic bearers for mobile networks, and configure interfaces, for example. CLI 414, RPD 416, and SNMP 418 in this example configure forwarding plane 403 via FU interface 422 to implement configured services, and/or add/modify/delete routes. FU interface 422 allows daemons 412 to drive the installation and configuration of forwarding units 430. In particular, FU interface 422 includes an application programming interface (API) by which daemons 412 may map packet flows to fabric interfaces for forwarding.

Each of forwarding units 430 implements forwarding plane 403 (also known as a "data plane") functionality to handle packet processing from ingress interfaces on which packets are received to egress interfaces to which packets are sent. Forwarding plane 403 determines data packet forwarding through network device 300, applies services, rate limits packet flows, filters packets, and otherwise processes the packets using service objects and lookup data installed by control plane 402 to forwarding plane 403.

Forwarding unit 430A may include packet processor 435A. Packet processor 435A may include, e.g., Application-specific integrated circuit based packet processors ("ASICs") or any packet forwarding engine that performs optimized multicast packet forwarding in accordance with techniques described herein. Packet processor 435A includes a programmable application-specific integrated circuit having key engine 442A that executes microcode (or "microinstructions") to control and apply fixed hardware units of packet processor 435A to process packet "keys." A packet key includes packet fields and other parameters that determine a flow of packet.

Forwarding path 448A of packet processor 435A comprises programmable, executable microcode and fixed hardware units that determine the packet processing actions and other operations performed by a key engine 442A. Forwarding unit 430A may store executable instructions of forwarding path 448A in computer-readable storage media, such as static random access memory (SRAM). While illustrated within packet processor 435A, in some examples executable instructions of forwarding path 448A may be stored in memory external to packet processor 435A in forwarding unit 430A.

As further described below with respect to FIG. 5, forwarding path 448A may include forwarding plane data structure 454A that comprises tables or other data structures such as Bit Index Forwarding Tables that includes identifiers of the egress routers (e.g., BFR-IDs), outgoing bitmasks (e.g., bitmasks generated based on bit positions of egress routers reachable by a corresponding neighboring router that are logically ORed together) to be encapsulated with outgoing multicast packets, and neighboring router information. Forwarding path 448A may also include next hop database 456A that comprises tables or other data structures that includes egress packet processor identifiers (e.g., identifier of forwarding unit 430N) to which the multicast packet is to be sent for forwarding to the one or more egress routers, and/or outgoing interfaces to output the multicast packet to the one or more egress network devices specified by the multicast identifier.

Forwarding unit microprocessor 434 ("FU microprocessor 434") manages packet processor 435A and executes programming interface 432 to provide an interface for/to routing unit 404. Programming interface 432 may comprise one or more user- or kernel-level libraries, programs, toolkits, application programming interfaces (APIs) and may communicate control and data messages to forwarding units 435 via internal communication link (e.g., communication link 330 in FIG. 3) using sockets, for example. FU microprocessor 434 may execute a microkernel 436 to provide an operating environment for interfaces. Programming interface 432 receives messages from routing unit 404 directing packet forwarding unit 430A to configure forwarding path 448A.

In accordance with the techniques of this disclosure, packet processor 435A may include cache 446A that stores multicast forwarding information to optimize multicast forwarding. Assume for example that network device 300 of FIG. 4 represents router 102B of FIGS. 1-2, and packet processor 435A operates as an ingress packet processor and packet processor 435N operates as an egress packet processor. In this example, ingress packet processor 435A may receive inbound multicast packet. Key engine 442A of ingress packet processor 435A may determine that a multicast identifier is encapsulated with the inbound multicast packet. For example, key engine 442A may be configured to implement BIER protocol 410 and recognizes, for example, BIER headers that are encapsulated with incoming multicast packets. Key engine 442A may determine that the multicast identifier includes a bit-string of a BIER header that identifies a set of one or more egress routers for which the multicast packet is destined. For example, the multicast identifier may be a bit-string of 0111 that identifies routers 102D-102F of FIG. 1 as egress routers of the multicast packet.

Ingress packet processor 435A may perform a lookup of cache 446A to determine whether the multicast identifier is included in cache 446A. If cache 446A includes the multicast identifier encapsulated with the incoming multicast packet, ingress packet processor 435A may determine multicast forwarding information (e.g., identifier for egress packet processor 435N of forwarding unit 430N) associated with the multicast identifier included in cache 446A without performing a lookup of forwarding plane data structure 454A, and forward a copy of the multicast packet to egress packet processor 435A.

If cache 446A does not include the multicast identifier of the incoming multicast packet, ingress packet processor 435A may configure cache 104B to store multicast forwarding information resulting from a lookup of forwarding plane data structure 454A for the current multicast packet. For example, ingress packet processor 435A may configure cache 446A to store the multicast identifier from the incoming multicast packet (e.g., 0111) as an index to cache 446A. Ingress packet processor 435A also performs a lookup of forwarding plane data structure 454A to determine the neighboring routers and outgoing bitmasks to be encapsulated with outgoing multicast packets to the neighboring routers, and performs a lookup of next hop database 456A to determine one or more egress packet processors (e.g., egress packet processor 435N) to which the multicast packet is to be sent for forwarding to the one or more egress routers. The information resulting from the lookup of forwarding plane data structure 454A and next hop database 456A is stored in cache 446A.

In this way, when ingress packet processor 435A receives a subsequent multicast packet with the multicast identifier included in cache 446A (e.g., 0111), ingress packet processor 435A may determine from cache 446A that ingress packet processor 435A is to send the multicast packet to egress packet processor 435N without performing a lookup of forwarding plane data structure 454A, and forwards a copy of the multicast packet to egress packet processor 435N of forwarding unit 430N.

Egress packet processor 435N may comprise similar modules (described below with a designation of "N") of ingress packet processor 435A that perform substantially similar functionality. In response to receiving the copy of the multicast packet from ingress packet processor 435A, key engine 442N of egress packet processor 435N may perform a lookup of cache 446N to determine whether the multicast identifier is included in cache 446N.

If cache 446N includes the multicast identifier of the incoming multicast packet, egress packet processor 435N may determine multicast forwarding information (e.g., outgoing bitmasks and outgoing interfaces) associated with the multicast identifier included in cache 446N without performing a lookup of forwarding plane data structure 454N, and output the multicast packet via the outgoing interface of network device 300. For example, egress packet processor 435N may determine from cache 446N the outgoing interface of network device 300 to output the multicast packet to the egress routers (e.g., routers 102C or 102E) specified by the multicast identifier.

If cache 446A does not include the multicast identifier of the incoming multicast packet, egress packet processor 435N may configure cache 446N to store multicast forwarding information resulting from a lookup of forwarding plane data structure 454N for the current multicast packet. For example, egress packet processor 435N may configure cache 446N to store the multicast identifier from the incoming multicast packet as an index to cache 446N. Egress packet processor 435N also performs a lookup of forwarding plane data structure 454N to determine the neighboring router and bitmask to encapsulate an outgoing multicast packet to the neighboring router, and performs a lookup of next hop database 456N to determine the outgoing interfaces of network device 300 to output the multicast packet to the one or more egress routers specified by the multicast identifier. The information resulting from the packet processing described above is stored in cache 446N.

In this way, when egress packet processor 435N receives a subsequent multicast packet including a multicast identifier that matches the multicast identifier stored in cache 446N, egress packet processor 435N may determine from cache 446N the multicast forwarding information (e.g., outgoing bitmask and outgoing interface) without performing a lookup of forwarding plane data structure 454N and next hop database 456N, and output the multicast packet to the egress network devices (e.g., routers 102C or router 102E) specified by the multicast identifier.

Figure 5:
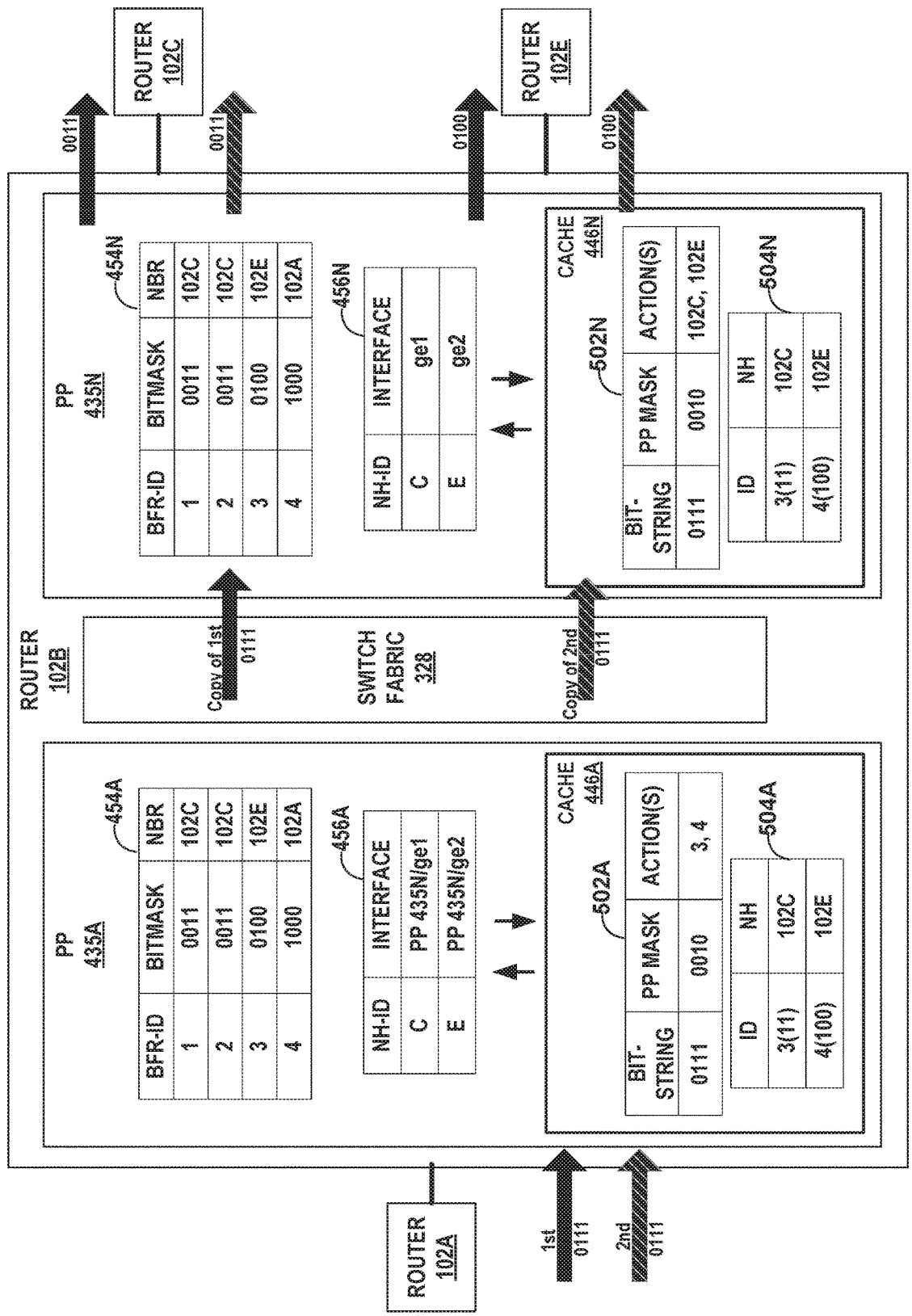
FIG. 5 is a block diagram illustrating a packet processor of FIG. 4 in further detail, in accordance with one or more aspects of the techniques described in this disclosure.

FIG. 5 is a block diagram illustrating a packet processor of FIG. 4 in further detail, in accordance with one or more aspects of the techniques described in this disclosure. For ease of illustration, FIG. 5 is described with respect to router 102B of FIGS. 1-2 and network device 300 of FIG. 4, but may represent any of routers 102 of FIGS. 1-2. In the example of FIG. 5, router 102B may be an intermediate router that forwards multicast traffic from ingress router 102A to neighboring routers 102C and 102E.

Router 102B may include packet processors 435A-435N (collectively, "packet processors 435"). In the example of FIG. 5, packet processor 435A may be configured to operate as an ingress packet processor and packet processor 435N may be configured to operate as an egress packet processor. Ingress packet processor 435A may forward multicast packets to egress packet processor 435N via switch fabric 328 to forward multicast traffic over the network to egress routers 102C and 102E. Although illustrated with only a single egress packet processor, routers may include two or more egress packet processors.

In the example of FIG. 5, packet processors 435 may include forwarding plane data structures 454A-454N, respectively, that each includes, for example, identifiers for egress routers of a multicast domain (illustrated as "BFR-ID" in FIG. 5), outgoing bitmasks (e.g., bit positions of egress routers that are logically ORed together) that are to be encapsulated with outgoing multicast packets, and neighboring routers (illustrated as "NBR" in FIG. 5). Packet processors 435 may also include next hop databases 456A-456N (collectively, "next hop databases 456") that include, for example, identification of egress packet processors for which ingress packet processor 435A is to forward a copy of the incoming multicast packet and/or identification of outgoing interfaces for which egress packet processor 435N is to output the multicast packet to neighboring routers, e.g., routers 102C and 102E, toward the set of egress routers specified by the multicast identifier (e.g., egress routers 102D-102F).

In accordance with the techniques described herein, packet processors 435 may include caches 446A-446N (collectively, "caches 446"), respectively, that include multicast forwarding information. As one example, each of caches 446 includes a first level, e.g., first level 502A-502N, including a bit-string of an incoming multicast packet, an egress packet processor identifier (e.g., a bitmask for the egress packet processor), and one or more actions associated with the bit-string. Each of caches 446 also includes a second level, e.g., second level 504A-504N, including the one or more final actions, such as the identification of the next hop router and the outgoing bitmask to be encapsulated to an outgoing multicast packet forwarded to the next hop router.

As one example implementation, ingress packet processor 435A may receive a first multicast packet including a multicast identifier of 0111. Ingress packet processor 435A may perform a lookup of cache 446A to determine whether cache 446A includes a multicast identifier that matches the multicast identifier of the incoming multicast packet. Assume for example that cache 446A does not include the multicast identifier of 0111. In this instance, ingress packet processor 435A may store the multicast identifier as an index to cache 446A. The cache index is derived from the packet's properties, thereby avoiding any cache index allocation logic. Ingress packet processor 435A may also configure cache 446A to store the multicast forwarding information resulting from a lookup of forwarding plane data structure 454A and next hop database 456A. For instance, ingress packet processor 435A may perform a lookup of forwarding plane data structure 454A and perform a logical AND operation with the multicast identifier (e.g., 0111) and each of the outgoing bitmask entries. In this example, ingress packet processor 435A may determine from the logical AND operation that the multicast packet is to be output to neighboring routers 102C and 102E to reach egress routers 102D-102F (e.g., BFR-IDs 1-3). Ingress packet processor 435A may configure cache 446A to store the next hop information and outgoing bitmasks in the second level 504A of cache 446A. In the example of FIG. 5, the indices of the second level 504A of cache 446A are derived from pre-populated next hop databases, e.g., next hop database 456A. In this way, the indices of the second level 504A of cache 446A are not dependent on the incoming multicast packet.

Ingress packet processor 435A may perform a lookup of next hop database 456A to determine that the multicast packet is to be sent to egress packet processor 435N for forwarding the multicast packet to egress routers 102D-102F reachable by neighboring routers 102C and 102E, respectively. Ingress packet processor 435A may configure cache 446A to store the egress packet processor information in the second level 504A of cache 446A. In some examples, ingress packet processor 435A may configure cache 446A to store a bitmask of egress packet processor 435N (e.g., 0010).

Ingress packet processor 435A may copy the first multicast packet and forward the copied multicast packet to egress packet processor 435N. Egress packet processor 435N may receive the first multicast packet including the multicast identifier of 0111. Egress packet processor 435N may perform a lookup of cache 446N and determine that cache 446N does not include a multicast identifier that matches the multicast identifier of the incoming multicast packet. Egress packet processor 435N may store the multicast identifier as an index to cache 446N. Egress packet processor 435N may also configure cache 446N to store the multicast forwarding information determined from a lookup of forwarding plane data structure 454N and next hop database 456N. For instance, egress packet processor 435N may perform a lookup of forwarding plane data structure 454N and perform a logical AND operation with the multicast identifier (e.g., 0111) and each of the outgoing bitmask entries. In this example, egress packet processor 435N may determine from the logical AND operation that the multicast packet is to be output to neighboring routers 102C and 102E to reach egress routers 102D-102F (e.g., BFR-IDs 1-3). Egress packet processor 435N may configure cache 446N to store the next hop information and corresponding outgoing bitmasks in the second level 504N of cache 446N. In the example of FIG. 5, the indices of the second level 504N of cache 446N are derived from pre-populated next hop databases, e.g., next hop database 456N. In this way, the indices of the second level 504N of cache 446N are not dependent on the incoming multicast packet.

Egress packet processor 435N may perform a lookup of next hop database 456N to determine that the multicast packet is to be output via outgoing interfaces ge1 and ge2 to reach neighboring routers 102C and 102E, respectively. Egress packet processor 435N may configure cache 446N to store information on the outgoing interfaces for which egress packet processor 324N may output an outgoing multicast packet to neighboring routers 102C and/or 102E.

Assume for example router 102B receives a second multicast packet including a multicast identifier of 0111. Ingress packet processor 435A may perform a lookup of cache 446A and determines that cache 446A includes a multicast identifier that matches the multicast identifier encapsulated with the second multicast packet. Ingress packet processor 435A may determine from the first level 504A of cache 446A that ingress packet processor 435A is to send a copy of the multicast packet to egress packet processor 435N (e.g., PP mask 0010) for forwarding the multicast packet to routers 102C and 102E. Ingress packet processor 435A may copy the second multicast packet and forward the copy of the second multicast packet to egress packet processor 435N via switch fabric 328.

In response to receiving the copy of the second multicast packet from ingress packet processor 435A, egress packet processor 435N may perform a lookup of cache 446N and determines that cache 446N includes a multicast identifier that matches the multicast identifier of the second multicast packet. Egress packet processor 435N may determine from the first level 502N of cache 446N that the action of egress packet processor 435N is to output a respective multicast packets to next hop router 102C and next hop router 102E. Egress packet processor 435N may also determine from the second level 504N of cache 446N the outgoing bitmasks to be encapsulated with the outgoing multicast packets. For example, egress packet processor 435N may determine that an outgoing multicast packet is to be encapsulated with 0011 when outputting the multicast packet to next hop router 102C. Similarly, egress packet processor 435N may determine that an outgoing multicast packet is to be encapsulated with 0100 when outputting the multicast packet to next hop router 102E.

In this way, multicast forwarding may in some instances only perform a lookup of cache 446 without performing a lookup of forwarding plane data structures 454 and next hop databases 456. As a result, the number of hardware instructions required to implement multicast forwarding is reduced, thereby increasing the performance of the network device. In addition, the techniques described herein eliminates the need for sending control messages between forwarding units to synchronize caches across forwarding units, as the packet processor automatically derives the cache index from the incoming packet.

In addition, a multi-level cache may provide one or more technical advantages. As described above, the indices in the second level of the cache are not derived from the incoming packet, but rather from the next-hop databases. As such, in the event a multicast receiver joins or leaves the multicast group, only the second level cache would need to be updated. Therefore, the techniques may require fewer processing resources and improve the operation (e.g., packet forwarding throughput) of the network device.

Figure 6:
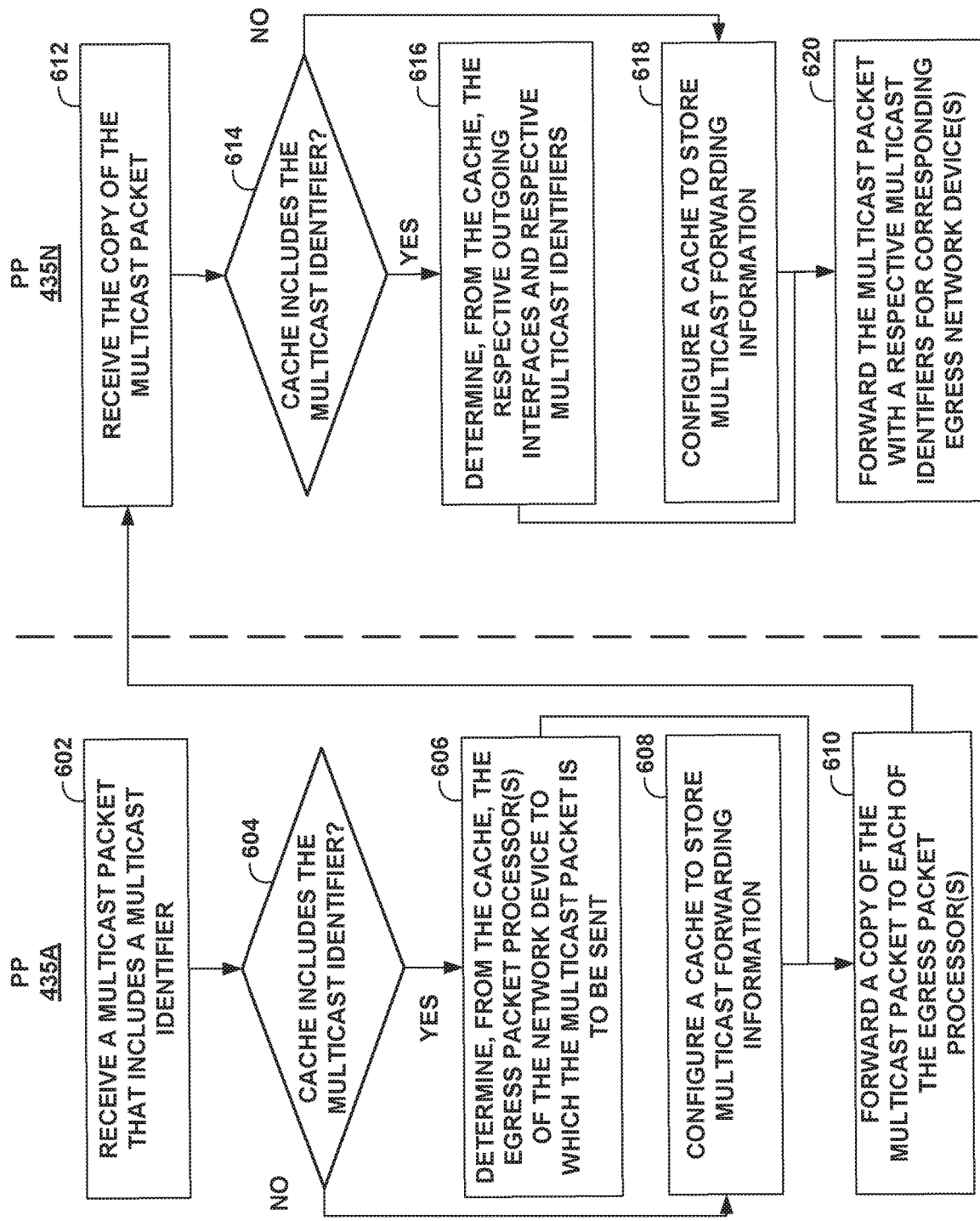
FIG. 6 is a flowchart illustrating example operation of a network device, in accordance with one or more aspects of the techniques described in this disclosure.

FIG. 6 is a flowchart illustrating an example operation of a network device, in accordance with one or more aspects of the techniques described in this disclosure. FIG. 6 will be described for purposes of example with respect to packet processors 435 of FIGS. 4-5.

In the example of FIG. 6, an ingress packet processor 435A receives a multicast packet that includes a multicast identifier (602). For example, ingress packet processor 435A may receive a multicast packet from an interface of interface cards (e.g., IFCs 322 of FIG. 3) each associated with a respective one of forwarding unit 430A. Key engine 442A of ingress packet processor 435A may examine the incoming multicast packet and determine that the multicast packet includes a multicast identifier (e.g., 0111) that specifies a set of one or more egress routers (e.g., routers 102D-102F). Key engine 442A may forward the encapsulated multicast packet to cache 446A for packet processing.

Ingress packet processor 435A may determine whether cache 446A includes the multicast identifier (604). For example, ingress packet processor 435A may perform a lookup of cache 446A to determine whether the multicast identifier of 0111 of the multicast packet matches the multicast identifier included in cache 446A.

If cache 446A includes the multicast identifier ("YES" branch of step 604), ingress packet processor 435A may determine, from cache 446A, one or more egress packet processors of the network device to which the multicast packet is to be sent (606). For example, ingress packet processor 435A may perform a lookup of cache 446A (i.e., the first level 502A of cache 446A) to determine an egress packet processor identifier (e.g., PP mask 0010) that identifies egress packet processor 435N to which the multicast packet is to be sent for forwarding to egress routers 102D-102F specified by the multicast identifier that are reachable via next hop routers 102C and 102E, respectively.

If cache 446A does not include the multicast identifier ("NO" branch of step 604), ingress packet processor 435A may configure cache 446A to store multicast forwarding information resulting from a lookup of a forwarding plane data structure (608). For example, ingress packet processor 435A may configure cache 446A to store the multicast identifier of 0111 encapsulated with the incoming multicast packet as an index in cache 446A. Ingress packet processor 435A may also perform a lookup of forwarding plane data structure 454A (e.g., BIFT) to determine the next hop information and outgoing bitmask to be encapsulated with outgoing multicast packets. For example, ingress packet processor 435A may perform a logical AND operation between the multicast identifier of 0111 to each outgoing bitmask entry of forwarding plane data structure 454A. In response, ingress packet processor 435A may determine that the multicast packet is to forward the multicast packet to neighboring routers 102C and 102E to reach egress routers 102D-102F. Ingress packet processor 435A may store the result of the packet processing described above in the second level 504A of cache 446A.

Ingress packet processor 435A may also perform a lookup of next hop database 456A to determine the egress packet processor to which the multicast packet is to be sent for forwarding to the set of one or more egress routers specified by the multicast identifier. Ingress packet processor 435A may store the result of the packet processing described above in the first level 502A of cache 446A.

Ingress packet processor 435A may forward a copy of the multicast packet to each of the one or more egress packet processors to which the multicast packet is to be forwarded to the one or more egress routers indicated by the multicast identifier (610). For example, ingress packet processor 435A may copy the incoming multicast packet and forward a copy of the multicast packet to egress packet processor 435N via switch fabric 328 such that egress packet processor 435N may output multicast packets to neighboring routers 102C and 102E, respectively.

Egress packet processor 435N may receive the copy of the multicast packet (612) and determine whether cache 446N includes the multicast identifier (614). For example, egress packet processor 435N may perform a lookup of cache 446N to determine whether the multicast identifier of 0111 of the multicast packet matches the multicast identifier included in cache 446N.

If cache 446N includes the multicast identifier ("YES" branch of step 614), egress packet processor 435N may determine, from cache 446N, respective outgoing interfaces of the network device to output the multicast packet toward each of the egress routers specified by the multicast identifier, and respective multicast identifiers for corresponding egress network device of the set of one or more egress network devices (616). For example, egress packet processor 435N may perform a lookup of cache 446N (i.e., the first level 502N of cache 446N) to determine the outgoing interface (e.g., ge1 or ge2) that is used to output the multicast packet to egress routers 102D-102F that are reachable via neighboring routers 102C and 102E, respectively. Egress packet processor 435N may also determine from a lookup of cache 446N the outgoing bitmasks 0011 and 0100 that are to be encapsulated with outgoing multicast packets to routers 102C and 102E, respectively.

If cache 446N does not include the multicast identifier ("NO" branch of step 614), egress packet processor 435N may configure cache 446N to store multicast forwarding information resulting from a lookup of a forwarding plane data structure (618). For example, egress packet processor 435N may configure cache 446N to store the multicast identifier of 0111 encapsulated with the incoming multicast packet in cache 446N. Egress packet processor 435N may also perform a lookup of forwarding plane data structure 454N (e.g., BIFT) to determine the next hop information and outgoing bitmask to be encapsulated with outgoing multicast packets. For example, egress packet processor 435N may perform a logical AND operation between the multicast identifier of 0111 to each outgoing bitmask entry of forwarding plane data structure 454N. In response, egress packet processor 435N may determine that the multicast packet is to forward the multicast packet to neighboring routers 102C and 102E to reach egress routers 102D-102F. Egress packet processor 435N may store the result of the packet processing described above in the second level 504N of cache 446A.

Egress packet processor 435N may also perform a lookup of next hop database 456N to determine the outgoing interfaces to output the multicast packet toward the set of one or more egress routers specified by the multicast identifier. Egress packet processor 435N may store the result of the packet processing described above in the first level 502N of cache 446N.

Egress packet processor 435N may output the multicast packet to each of the one or more egress packet processors (620). For example, egress packet processor 435N may output the multicast packet with a multicast identifier of 0011 and output the encapsulated multicast packet via interface ge1 to router 102C. Similarly, egress packet processor 435N may output the multicast packet with a multicast identifier of 0100 and output the encapsulated multicast packet via interface ge2 to router 102E.

The techniques described herein may be implemented in hardware, software, firmware, or any combination thereof. Various features described as modules, units or units may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" indicates that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   receiving, by a packet processor of a plurality of packet processors of a network device in a multicast domain, a multicast packet that includes a multicast identifier that specifies a set of one or more egress network devices of the multicast domain;
   configuring, by the packet processor and in response to determining that a cache does not include the multicast identifier, a first level of the cache to include the multicast identifier as an index of the cache, an identifier of one or more egress packet processors of the network device that is to forward the multicast packet to the set of one or more egress network devices, and one or more actions to forward the multicast packet toward one or more corresponding egress network devices of the set of one or more egress network devices specified by the multicast identifier, wherein the first level of the cache is configured based on a Bit Index Explicit Replication (BIER) forwarding table (BIFT) including respective multicast identifiers of the one or more corresponding egress network devices and a next hop database specifying outgoing interfaces to reach the one or more corresponding egress network devices;
   configuring, by the packet processor and for the one or more actions, a second level of the cache, based on the BIFT and the next hop database, to include next hop information for the one or more corresponding egress network devices and the respective multicast identifiers for the one or more corresponding egress network devices, wherein configuring the second level of the cache comprises deriving the respective multicast identifiers of the second level of the cache from the next hop database of the network device and not from the multicast packet; and
   in response to receiving a subsequent multicast packet including the multicast identifier that specifies the set of one or more egress network devices, performing, by the packet processor, a lookup of the cache without performing a lookup of the BIER forwarding table and the next hop database, wherein performing the lookup of the cache comprises at least one of:
  performing a lookup of the first level of the cache to determine the one or more egress packet processors to which a copy of the subsequent multicast packet is to be forwarded, and
  performing a lookup of the second level of the cache to determine the respective multicast identifiers by which the copy of the subsequent multicast packet is to be encapsulated in order to forward the copy of the subsequent multicast packet to the one or more corresponding egress network devices.

2. The method of claim 1, wherein the packet processor comprises an ingress packet processor, wherein performing the lookup of the first level of the cache to determine the one or more egress packet processors to which the copy of the subsequent multicast packet is to be forwarded comprises:
  determining, by the ingress packet processor and based on the lookup of the first level of the cache, the identifier of the one or more egress packet processors to which the copy of the subsequent multicast packet is to be sent for forwarding to the one or more corresponding egress network devices; and
  forwarding, by the ingress packet processor and based on the identifier of the one or more egress packet processors, the copy of the subsequent multicast packet to each of the one or more egress packet processors.

3. The method of claim 1, wherein the packet processor comprises a given egress packet processor of the one or more egress packet processors,
  wherein performing the lookup of the second level of the cache to determine the respective multicast identifiers by which the copy of the subsequent multicast packet is to be encapsulated in order to forward the copy of the subsequent multicast packet to the one or more corresponding egress network devices comprises:
  receiving, by the given egress packet processor and from an ingress packet processor of the network device, the copy of the subsequent multicast packet, wherein the copy of the subsequent multicast packet includes the multicast identifier for the set of one or more egress network devices;
  determining, by the given egress packet processor and based on the lookup of the first level of the cache, the one or more actions to forward the copy of the subsequent multicast packet toward the one or more corresponding egress network devices;
  determining, by the given egress packet processor and based on the lookup of the second level of the cache, the respective multicast identifiers for the one or more corresponding egress network devices; and
  forwarding, by the given egress packet processor and to each of the one or more corresponding egress network devices, the copy of the subsequent multicast packet encapsulated with a corresponding one of the respective multicast identifiers of the one or more corresponding egress network devices.

4. The method of claim 1, wherein configuring the first level of the cache further comprises:
  determining, by the packet processor and based on a lookup of the BIFT, the one or more egress network devices that are associated with a bitmask of the multicast identifier, wherein each bit of the bitmask corresponds to a different one of a plurality of egress network devices in a network, wherein the set of one or more egress network devices is a subset of the plurality of egress network devices;
  determining, by the packet processor and based on a lookup of the next hop database, the one or more egress packet processors corresponding to the set of one or more egress network devices that are associated with the bitmask of the multicast identifier; and
  storing, based on the lookup of the BIFT and the next hop database, by the packet processor and to the first level of the cache, the identifier of the one or more egress packet processors.

5. The method of claim 1, wherein configuring the second level of the cache further comprises:
  determining, by the packet processor and based on a lookup of the BIFT, one or more outgoing bitmasks that are associated with a bitmask of the multicast identifier; and
  storing, by the packet processor and to the second level of the cache, the one or more outgoing bitmasks.

6. The method of claim 1, wherein the multicast identifier comprises a bit-string that includes a set of one or more bits that each represent a corresponding egress network device of the set of one or more egress network devices of the multicast domain.

7. The method of claim 1, wherein the multicast identifier comprises a Bit Index Explicit Replication (BIER) header.

8. A network device comprising:
  a memory; and
  a packet processor of a plurality of packet processors in communication with the memory, wherein the packet processor is configured to:
  receive a multicast packet that includes a multicast identifier that specifies a set of one or more egress network devices of the multicast domain;
  configure, in response to determining that a cache of the packet processor does not include the multicast identifier, a first level of the cache to include the multicast identifier as an index of the cache an identifier of one or more egress packet processors of the network device that is to forward the multicast packet to the set of one or more egress network devices, and one or more actions to forward the multicast packet toward one or more corresponding egress network devices of the set of one or more egress network devices specified by the multicast identifier, wherein the first level of the cache is configured based on a Bit Index Explicit Replication (BIER) forwarding table (BIFT) including respective multicast identifiers of the one or more corresponding egress network devices and a next hop database specifying outgoing interfaces to reach the one or more corresponding egress network devices;
  configure, for the one or more actions, a second level of the cache, based on the BIFT and the next hop database, to include next hop information for the one or more corresponding egress network devices and the respective multicast identifiers for the one or more corresponding egress network devices, wherein to configure the second level of the cache comprises deriving the respective multicast identifier of the second level of the cache from the next hop database of the network device and not from the multicast packet; and
  in response to receiving a subsequent multicast packet including the multicast identifier that specifies the set of one or more egress network devices, perform a lookup of the cache without performing a lookup of the BIER forwarding table and the next hop database, wherein to perform the lookup of the cache comprises at least one of:

performing a lookup of the first level of the cache to determine the one or more egress packet processors to which a copy of the subsequent multicast packet is to be forwarded, and performing a lookup of the second level of the cache to determine the respective multicast identifiers by which the copy of the subsequent multicast packet is to be encapsulated in order to forward the copy of the subsequent multicast packet to the one or more corresponding egress network devices.

9. The network device of claim 8, wherein, to configure the first level of the cache, the packet processor is further configured to:

determine, based on a lookup of the BIFT, the one or more egress network devices that are associated with a bitmask of the multicast identifier, wherein each bit of the bitmask corresponds to a different one of a plurality of egress network devices in a network, wherein the set of one or more egress network devices is a subset of the plurality of egress network devices;

determine, based on a lookup of the next hop database, the one or more egress packet processors corresponding to the set of one or more egress network devices that are associated with the bitmask of the multicast identifier; and store the identifier of the one or more egress packet processors to the first level of the cache.

10. The network device of claim 8, wherein the packet processor comprises an ingress packet processor, wherein to perform the lookup of the first level of the cache to determine the one or more egress packet processors to which the copy of the subsequent multicast packet is to be forwarded, the ingress packet processor is further configured to:

determine, based on the lookup of the first level of the cache of the ingress packet processor, the identifier of the one or more egress packet processors to which the copy of the subsequent multicast packet is to be sent for forwarding to the one or more corresponding egress network devices; and forward the copy of the subsequent multicast packet to each of the one or more egress packet processors.

11. The network device of claim 8, wherein, to configure the first level of the cache of the egress packet processor, the egress packet processor is further configured to:

determine, based on a lookup of the BIFT, the one or more outgoing bitmasks that are associated with a bitmask of the multicast identifier, wherein each bit of the bitmask corresponds to a different one of a plurality of egress network devices in a network, wherein the set of one or more egress network devices is a subset of the plurality of egress network devices; store the one or more outgoing bitmasks to the second level of the cache of the egress packet processor.

12. The network device of claim 8, wherein the packet processor comprises a given egress packet processor of the one or more egress packet processors, wherein to perform the lookup of the second level of the cache to determine the respective multicast identifiers by which the copy of the subsequent multicast packet is to be encapsulated in order to forward the copy of the subsequent multicast packet to the one or more corresponding egress network devices, the egress packet processor is configured to:

receive, from an ingress packet processor of the network device, the copy of the subsequent multicast packet, wherein the copy of the subsequent multicast packet includes the multicast identifier for the set of one or more egress network devices;

determine, based on the lookup of the first level of the cache the one or more actions to forward the copy of the subsequent multicast packet toward the one or more corresponding egress network devices;

determine, based on the lookup of the second level of the cache, the respective multicast identifiers for the one or more corresponding egress network devices; and forward, to each of the one or more corresponding egress network devices, the copy of the subsequent multicast packet encapsulated with a corresponding one of the respective multicast identifiers of the one or more corresponding egress network devices.

13. The network device of claim 8, wherein the multicast identifier comprises a bit-string that includes a set of one or more bits that each represent a corresponding egress network device of the set of one or more egress network devices of the multicast domain.

14. The network device of claim 8, wherein the multicast identifier comprises a Bit Index Explicit Replication (BIER) header.

15. A non-transitory computer-readable storage medium of a network device including a plurality of packet processors, the non-transitory computer-readable storage medium storing instructions that when executed, cause one or more programmable processors of the network device to:

receive a multicast packet that includes a multicast identifier that specifies a set of one or more egress network devices of the multicast domain;

configure, in response to determining that a cache does not include the multicast identifier, a first level of the cache to include the multicast identifier as an index of the cache, an identifier of one or more egress packet processors of the network device that is to forward the multicast packet to the set of one or more egress network devices, and one or more actions to forward the multicast packet toward one or more corresponding egress network devices of the set of one or more egress network devices specified by the multicast identifier, wherein the first level of the cache is configured based on a Bit Index Explicit Replication (BIER) forwarding table (BIFT) including respective multicast identifiers of the one or more corresponding egress network devices and a next hop database specifying outgoing interfaces to reach the one or more corresponding egress network devices;

configure, for the one or more actions, a second level of the cache, based on the BIFT and the next hop database, to include next hop information for the one or more corresponding egress network devices and the respective multicast identifiers for the one or more corresponding egress network devices, wherein to configure the second level of the cache comprises deriving the respective multicast identifiers of the second level of the cache from the next hop database of the network device and not from the multicast packet; and in response to receiving a subsequent multicast packet including the multicast identifier that specifies the set of one or more egress network devices, perform a lookup of the cache without performing a lookup of the BIER forwarding table and the next hop database, wherein to perform the lookup of the cache comprises at least one of:

performing a lookup of the first level of the cache to determine the one or more egress packet processors to which a copy of the subsequent multicast packet is to be forwarded, and performing a lookup of the second level of the cache to determine the respective multicast identifiers by which the copy of the subsequent multicast packet is to be encapsulated in order to forward the copy of the subsequent multicast packet to the one or more corresponding egress network devices.

16. The non-transitory computer-readable storage medium of claim 15, wherein the instructions further causing the one or more programmable processors of the network device to:

determine, based on a lookup of the BIFT, the one or more egress network devices that are associated with a bitmask of the multicast identifier, wherein each bit of the bitmask corresponds to a different one of a plurality of egress network devices in a network, wherein the set of one or more egress network devices is a subset of the plurality of egress network devices;

determine, based on a lookup of the next hop database, the one or more egress packet processors corresponding to the one or more egress network devices that are associated with the bitmask of the multicast identifier; and store, based on the lookup of the BIFT and the next hop database, the identifier of the one or more egress packet processors to the first level of the cache.

17. The non-transitory computer-readable storage medium of claim 15, wherein the instructions further causing the one or more programmable processors of an ingress packet processor of the network device to:

determine, based on the lookup of the first level of the cache, the bitmask associated with the one or more egress packet processors to which the copy of the subsequent multicast packet is to be sent for forwarding to the one or more corresponding egress network devices; and forwarding, by the ingress packet processor and to each of the one or more egress packet processors identified by the bitmask, the copy of the subsequent multicast packet.

18. The non-transitory computer-readable storage medium of claim 15, wherein the instructions further causing the one or more programmable processors of a given egress packet processor of the one or more egress packet processors to:

receive, from an ingress packet processor of the network device, the copy of the subsequent multicast packet, wherein the copy of the subsequent multicast packet includes the multicast identifier for the set of one or more egress network devices;

determine, based on the lookup of the first level of the cache, the one or more actions to forward the copy of the subsequent multicast packet toward the one or more corresponding egress network devices;

determine, in response to determining the one or more actions and based on the lookup of the second level of the cache, the respective multicast identifiers for the one or more corresponding egress network devices; and forward, to each of the one or more corresponding egress network devices, the copy of the subsequent multicast packet encapsulated with a corresponding one of the respective multicast identifiers of the one or more corresponding egress network devices.

* * * * *